June 3, 1952 P. J. NATHO 2,598,932
WELL PRESSURE GAUGE
Filed June 9, 1945
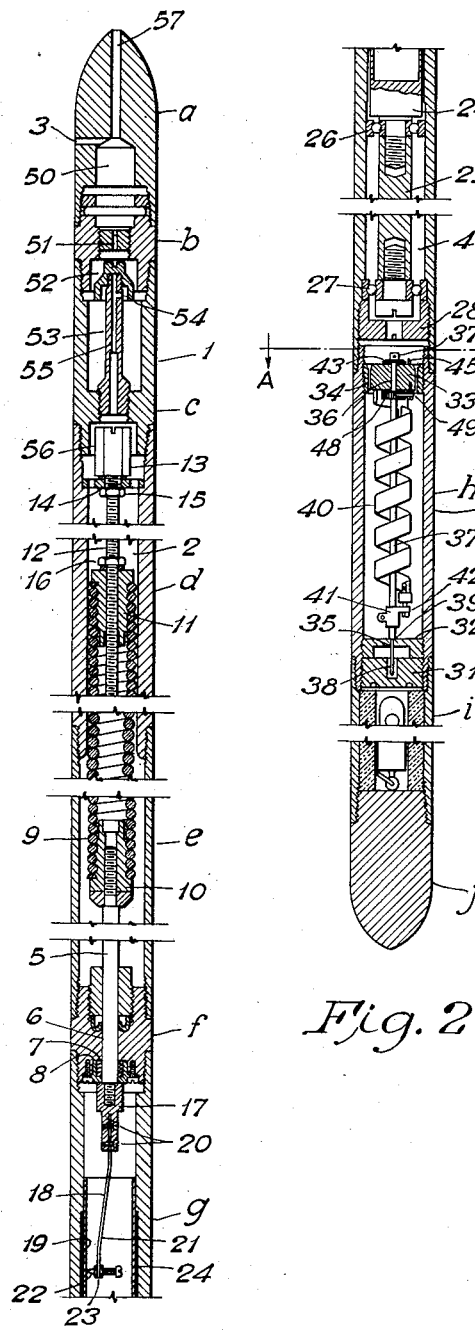
Fig. 1
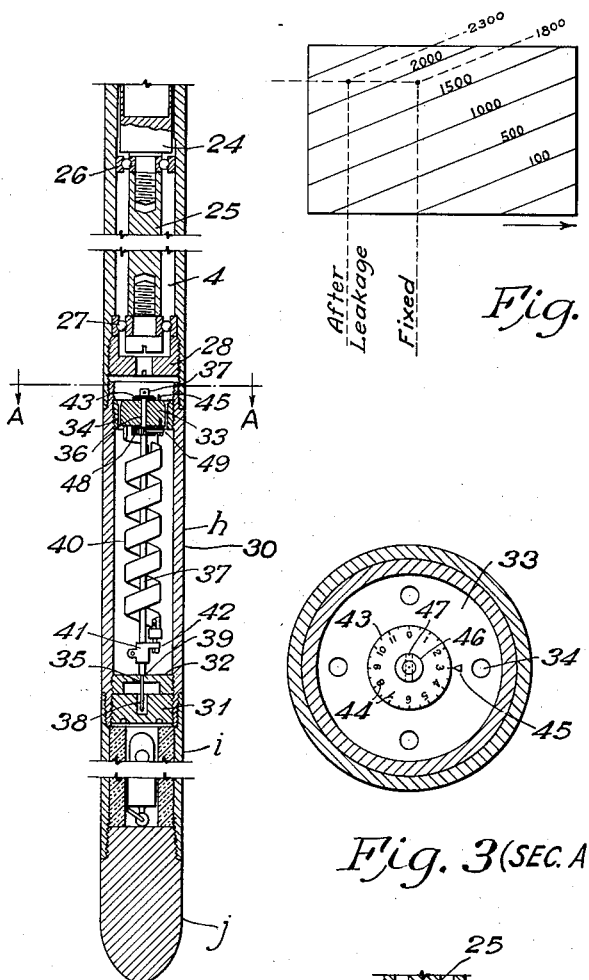
Fig. 2
Fig. 3 (SEC. A-A)
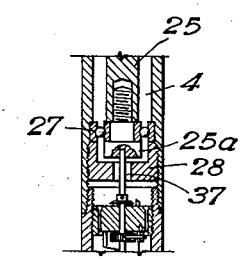
Fig. 4
Fig. 5
Inventor:—
Paul J. Natho
By Pike H. Sullivan
Attorney Patented June 3, 1952

2,598,932

UNITED STATES PATENT OFFICE 2,598,932

WELL PRESSURE GAUGE

Paul J. Natho, Lockport, La., assignor to Pan American Production Company, Houston, Tex., a corporation of Delaware Application June 9, 1945, Serial No. 598,585

8 Claims. (Cl. 73—300)

This invention relates to pressure gauges and recorders, and more particularly to well pressure gauges for oil wells which are adapted to be lowered into a bore hole on a wire or string of tubing to obtain an indication of pressure of the fluids in the bore hole and to record such indication.

It has long been established that a knowledge of the pressures prevailing in oil wells is essential for efficient oil field exploitation and numerous methods and devices for measuring and recording these pressures have been devised. One of such devices or gauges may be described as comprising a casing having at least one chamber therein which is adapted to be maintained at a fixed pressure, a pressure differential responsive means within the casing which is responsive to a difference between the pressure in the chamber and the pressure of the well fluids, and an indicating and recording means associated with the pressure differential responsive means, such as a chart and stylus, which indicates a response of the pressure responsive means and records the same. These gauges may include a clock mechanism which is connected to a rotating chart so that the pressures recorded are a function of the time that the gauge is maintained in the bore hole. It is the practice in these commercial gauges to provide calibrating means associated with the differential pressure responsive means as for example the design of the chart, so that the recording means will record the true pressure of the bore hole.

A serious drawback with gauges of this type has been the leakage which sometimes occurs in the fixed pressure chamber, thus causing a change in pressure within the chamber and consequently an erroneous or abnormal response of the pressure differential responsive means. It has been my experience that in many of the commercially available gauges of this type, such leakage is not uncommon and frequently the fact that leakage has occurred may not be detected from the gauge itself and thus not recognized until the readings obtained are compared with other known data. There is for this reason an uncertainty about any of the pressure readings obtained from these pressure gauges.

It is therefore the object of this invention to provide an improved well pressure gauge of the general type described which will indicate true well pressures, and particularly a gauge which will indicate data for correcting well pressures erroneously recorded due to leakage or other abnormal changes in pressure in the fixed pressure chamber. It is a further object to provide a gauge of the type described which normally measures and records true well pressures and which indicates an abnormal recording as well as the maximum extent of such abnormal recording. Other objects will be apparent from the following disclosure.

The well pressure gauge of my invention comprises a casing having at least one chamber therein, a pressure differential responsive means within said casing which is responsive to a difference in pressure between the chamber and the well fluids, an indicator and a recording means which is associated with the pressure differential responsive means for indicating the response of said means and recording the extent of such response, and a pressure indicator associated with the chamber for indicating a change in pressure in the chamber which is sufficient to cause a response of said pressure differential responsive means. More particularly, my invention comprises the improvement in conventional well pressure gauges of a pressure indicator associated with the fixed pressure chamber for indicating any changes in pressure which occur in said fixed pressure chamber by causing a response of said pressure indicator. It is thus seen that in my improved gauge, if a change in pressure in the chamber occurs as a result of leakage, the pressure indicator will indicate such leakage, and one using the gauge would immediately know that the well pressures recorded were not accurate. In my gauge I have further provided a dial or chart with my pressure indicator so that the maximum extent of the pressure change caused by the leakage will be recorded and from this information the well pressures can be corrected so that it would not be necessary to make a second reading or test in the well. In still another embodiment of my gauge I have associated my pressure indicator with the indicator of the well pressures so that the well pressures recorded will be corrected automatically and will represent the true well pressures irrespective of the fact that an abnormal pressure change caused by leakage has occurred.

My invention will be more clearly understood from the following description, including the attached drawings forming a part hereof, of a preferred embodiment of my gauge wherein:

Figure 1 shows a vertical, sectional view of the upper portion of my gauge;

Figure 2 shows a vertical, cross-sectional view of the lower portion joining the portion shown in Figure 1;

Figure 3 is a section on line A—A of Figure 2.

Figure 4 is a fragmentary vertical cross sectional view showing part of the lower portion of another embodiment of my gauge, which embodiment is similar in all other respects to the gauge illustrated in Figures 1 and 2.

Figure 5 is a representation of a typical chart obtained in the embodiment of my gauge illustrated in Figure 4.

Referring now to the drawings, my gauge comprises, or my improvement is adapted to, a substantially hollow casing or container 1 which is built up of a number of sections identified by the letters a, b, c, d, e, f, g, h, i and j, all joined together by threaded connections. This is the conventional manner of making well pressure gauges of this type, since often it is desirable to remove certain sections which perform a function not always required in every use of the gauge. Sections a, b, c, d, e, and f are commonly used in gauges of the class described, section a being known as a tail plug, b as a calibrating plug, c as a sand trap, d as a spring section including the spring case e, and f as a packing box, the structure of which sections forms no part of this invention except that they form a passage or chamber 2 for well fluids or pressures which may enter the gauge through port 3 in the tail plug which is sealed at one end by the packing box f. Section g is also a conventional structure and is referred to as the recorder section. Section h includes my pressure indicator and with section g forms a second chamber 4 within the casing, which second chamber is sealed from the pressure of the well fluids by the packing box and the closed end of section h. Section i is a thermometer for measuring the temperature at which the pressure readings are made and section j is a nose plug.

Within chambers 2 and 4 is a pressure differential responsive means comprising piston 5 suitably mounted in a bearing 6 formed as a part of a packing box f and passing through a seal or packing 7 secured in the packing gland 8. The piston extends into each chamber and is connected at one end in the chamber 2 to a helical spring 9 through a spring anchor nut 10 threadedly engaging the piston. The spring in turn is secured by a second spring anchor nut 11 to a spring-retaining bolt 12 threadedly engaged in the nut and rigidly secured by spring-retaining nut 13 to a spring-retaining disc 14 rigidly mounted within the spring section d. Lock nuts 15 and 16 serve to secure the spring-retaining nut 13 and anchor nut 11. At the other end of the piston in chamber 4 is a piston head 17 threadedly connected to the piston and normally urged into abutment with the packing gland by the tension of the spring 9.

It will be seen that the piston will move as a result of the pressure of the well fluid and the extent of the movement will depend upon a difference in pressure between chamber 2 and chamber 4 and upon the amount of tension applied to it by the helical spring. The tension of the spring can readily be adjusted when calibrating the gauge by moving the spring anchor nut 11 along the spring-retaining bolt and securing it in any desired position by the lock nut 16.

As an indicating and recording means associated with the pressure differential responsive means, there is provided a stylus 18 and chart 19. The stylus is secured to the piston head by screws 20 and comprises a spring arm 21 and a stylus point 22 held in the spring arm by means of a nut 23. The stylus is operatively associated with the chart 19 which is carried within a rotatable recording drum 24. The drum is supported by a drum carriage 25 mounted on ball bearings 26 and 27 within the recorder section g, and retained therein by a drum-retaining nut 28.

Immediately adjacent the drum-retaining nut and comprising section h is a pressure indicator and recorder comprising a steel shell 30 which is closed at one end by a relatively thick plug-like section 31 forming a thermometer plug for cooperation with the thermometer section i immediately adjacent it. Within the shell at either end is a pair of supports 32 and 33 threadedly engaging the inner walls of the shell. The support 33 has ducts 34 passing through it to provide communication with section g. Both supports have centrally disposed holes 35 and 36 in which is rotatably supported a spindle 37. The lower end of the spindle is formed with a stem 38 and shoulder 39, the stem passing through the support 32 while the shoulder slidably rests thereon. Disposed about the spindle is a Bourdon type pressure tube 40, which is hermetically sealed so as to be responsive to a change in external pressure. This tube is secured to the spindle at its lower end by means of an adjustable split collar 41 fastened to the spindle and carrying a lever arm 42 which is fastened to the Bourdon tube. The upper end of the tube is secured to the support 33. By this arrangement any extension or contraction of the Bourdon tube due to a pressure change will cause a rotation of the spindle.

To indicate and record this rotation there is secured to the spindle immediately above support 33 an indicator plate or dial 43 (see Fig. 3), suitably marked with numbers 44 for registering the degree of rotation of the spindle, relative to an indicator pointer 45 rigidly secured to the support. The indicator plate has a collar 46 which is slotted at 47 so that the position of the plate and spindle may be set with a screw driver or other tool to zero position for any static pressure in the container. This setting requires loosening of the split collar 41, rotating the spindle to the zero position, and then tightening the collar. In order to insure the recording of the maximum pressure change indicated by the pressure indicator, there is provided, as a stop mechanism, a ratchet wheel 48 secured to the spindle 37 immediately below the support 33 and adapted to be engaged by a pawl 49 fastened to the support.

In operation, when the gauge employing my idea is lowered into a well, the pressure will be transmitted to chamber 2, through the port 3 and will pass from one section to another through a chamber 50, duct 51, annular space 52, into a second hollow 53, and from there through port 54 down through duct 55, and annular groove 56 into the spring section d and case e. Port 57 serves as a means to fasten the bomb to a wire line for lowering the gauge into the well. The fluid in the chamber will then exert a pressure on the piston 5 which when great enough to overcome the pressure in chamber 4 and the tension of the helical spring 9 will move and thus cause the stylus point 22 to draw a line upon the chart 19. By a suitable calibration, the chart will indicate and record the pressure of the well fluids. Since this calibration depends upon the pressure differential, the pressure in chamber 4 must be of known value; and in the conventional pressure gauges, this pressure is maintained at atmospheric pressure. If this pressure changes due to leakage or some other cause, and is sufficient to affect the response of the piston and thus the recorded pressures, the well pressures recorded will no longer be accurate. However, if such a change in pressure does occur in my gauge, the Bourdon tube 40 will respond to such a change in pressure, causing a rotation of the spindle 37 and consequently the indicator plate 43. The extent of this rotation will be registered by the numbers 44 on the indicator plate and any retrograde rotation will be prevented by the cooperation of the ratchet 48 and pawl 49. By suitable calibration of the markings on the indicator plate, the maximum change in pressure in the chamber can be indicated and this value can be used to correct the pressure indicated for the well fluids. It is thus seen that in my improved gauge, I have means for indicating that leakage has occurred and for measuring the extent that the pressure readings are in error as a result of such leakage so that they may be corrected.

As another embodiment shown in Figure 4, I may extend the spindle 37 through a suitable opening in the drum-retaining nut 28 so as to engage the drum carriage 25 through a screw 25a and be rigidly connected thereto, and I may then provide suitable chart paper shown as projected in a single plane in Figure 5, so that pressure readings obtained for well fluids when the chamber 4 is at a fixed pressure will be different from those obtained if leakage has occurred. The correction is made by the rotation of the drum in the direction indicated when a change in the fixed pressure occurs due to leakage. For example a pressure indication of 1800 made before leakage would be equivalent to 2300 (uncorrected) after leakage, since a higher pressure in the well would necessarily be required to move the piston the same distance against an increased pressure in the chamber.

It will be observed that section $h$ in the above-described embodiment of my invention is a section for a well pressure gauge which can be inserted among the other sections making up a commercial gauge and thus the gauge may be modified to make my improved well pressure gauge. Many hundreds of the present commercial gauges in use could be readily modified by substituting section $h$ for one of the present sections known as the thermometer plug, since section $h$ incorporates as a part thereof a thermometer plug and has in addition the pressure indicator for the fixed pressure chamber.

The foregoing is a detailed description, by way of example, of a preferred embodiment of my invention. It is realized that many other embodiments will be obvious to those skilled in the art and, therefore, no limitations in the scope of my invention are intended except as are defined by the following claims.

I claim:

1. A well pressure gauge comprising a casing open to well pressure and having at least one chamber therein closed to well pressure, a pressure differential responsive means within the casing, associated with said chamber, said pressure differential responsive means being exposed to the well and to said chamber, and responsive to a difference in pressure therebetween, indicator means associated with said pressure differential responsive means for indicating a response of said responsive means, and a pressure indicator associated with the chamber and responsive to the pressure therein for indicating a change of pressure in said chamber sufficient to cause a response of said pressure differential responsive means.

2. A well pressure gauge comprising a casing including at least two chambers, one of the chambers being exposed to the pressure of fluid in the well and the other being sealed therefrom, differential pressure responsive means associated with the chambers and responsive to pressure differentials therebetween, an indicator associated with said differential pressure responsive means for indicating a pressure differential between said chambers, and a pressure indicating means, having maximum pressure registering means, associated with the sealed chamber and responsive to the pressure therein, for indicating a change of pressure in the sealed chamber sufficient to affect the indication of the first-named indicator.

3. A well pressure gauge comprising a casing including at least two chambers, at least one of the chambers being adapted to receive the well fluids under pressure and the other of said chambers being normally pressure tight, differential pressure responsive means associated with the chambers and adapted to respond to a pressure differential between the pressure of the well fluids in one chamber and the normally fixed pressure in the pressure-tight chamber, a recorder associated with said differential pressure responsive means for recording the pressure of the well fluids, and pressure indicating means having maximum pressure registering means responsive to the pressure in the pressure-tight chamber for indicating a pressure change resulting from leakage.

4. A well pressure gauge comprising a casing including a chamber adapted to receive well fluids and a second chamber, a seal between the chambers, a piston passing through said seal and extending into each of said chambers, said piston being adapted to move in response to a pressure differential between the well fluids and the second chamber, a recording means in said second chamber associated with said piston for continuously recording well fluid pressures as a function of the movement of the piston, and pressure indicating means in said second chamber responsive to the pressure therein, said pressure indicating means in said second chamber having maximum pressure indicating means for indicating a maximum change of pressure in said chamber.

5. A well pressure gauge comprising a casing including at least two chambers, one of the chambers being adapted to receive well fluids and the other normally being adapted to be maintained at a substantially fixed pressure, a seal between the chambers, a piston passing through said seal and extending into each of the chambers, said piston being adapted to move in response to a pressure differential between the chambers, recording means in the fixed pressure chamber associated with said piston for continuously recording well fluid pressures as a function of the normal responsive movement of said piston, and a pressure indicating means within the fixed pressure chamber and responsive to the pressure therein, for indicating a change in pressure in the normally fixed pressure chamber causing an abnormal responsive movement of said piston, and means associating said recording means and said pressure indicating means whereby the well fluid pressures recorded are corrected for such change in pressure.

6. An attachment for a well pressure gauge of the type described comprising a shell connectable at each end with said gauge and having one end closed by a plug, a hermetically sealed Bourdon tube centrally mounted within the shell and having one end secured thereto, a spindle rotatably mounted along the central axis of the shell and adjustably fastened to the unsecured end of the Bourdon tube, an indicating plate rigidly mounted on said spindle, a pointer mounted within said shell and associated with said indicator plate, and pawl and ratchet means associated with said indicating plate, whereby the maximum rotation of said spindle is registered.

7. In a well pressure gauge of the type described wherein a pressure differential responsive means indicates a difference in pressure between well fluids and a normally fixed pressure chamber, the improvement comprising maximum pressure registering means in said fixed pressure chamber responsive to the pressure therein whereby are indicated abnormal changes in pressure therein independent of changes in well pressures.

8. A well pressure gauge comprising a casing including at least two chambers, one of said chambers being adapted to receive well fluids and the other normally sealed from well fluids, a seal between said chambers, a piston passing through said seal and extending into each of said chambers, said piston being adapted to move responsive to a pressure differential, recording means in said normally sealed chamber associated with said piston for continuously recording well fluid pressures as a function of the normal responsive movement of said piston, and associated with said recording means a pressure responsive means within said normally sealed chamber responsive to the pressure therein, whereby well fluid pressures recorded are corrected for changes in pressure in said normally sealed chamber.

PAUL J. NATHO.

REFERENCES CITED

The following references are of record in the file of this patent:

UNITED STATES PATENTS

| Number | Name | Date |
|---|---|---|
| 331,133 | Hannay | Nov. 24, 1885 |
| 1,837,222 | Kannenstine | Dec. 22, 1931 |
| 1,998,996 | Pigott et al. | Apr. 23, 1935 |
| 2,015,851 | Herrick et al. | Oct. 1, 1935 |
| 2,184,689 | Savitz | Dec. 26, 1939 |